United States Patent
Louret et al.

(10) Patent No.: US 7,611,677 B2
(45) Date of Patent: *Nov. 3, 2009

(54) MULTI-ZONE FIXED-BED OR MOVING-BED REACTOR WITH AN INTEGRATED HEAT EXCHANGER

(75) Inventors: Sylvain Louret, Lyons (FR); Patrice Font, Mornant (FR); Sylvie Lacombe, Saint Genis Laval (FR); Eric Sanchez, Rueil Malmaison (FR); Laurent Simon, Lyons (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 515 days.

This patent is subject to a terminal disclaimer.

(21) Appl. No.: 11/267,570

(22) Filed: Nov. 7, 2005

(65) Prior Publication Data
US 2006/0115387 A1 Jun. 1, 2006

(30) Foreign Application Priority Data
Nov. 9, 2004 (FR) .................................. 04 11959

(51) Int. Cl.
*F27B 15/08* (2006.01)
*B01J 23/90* (2006.01)
(52) U.S. Cl. .................... 422/145; 422/141; 422/142; 422/213; 422/223
(58) Field of Classification Search ............. 422/146, 422/139, 141, 142, 145, 188, 190, 232, 236, 422/213, 219, 223
See application file for complete search history.

(56) References Cited

U.S. PATENT DOCUMENTS

| 2,336,041 | A |   | 12/1943 | Simpson et al. |
| 3,799,866 | A | * | 3/1974 | Lengemann ............... 208/139 |
| 4,547,151 | A |   | 10/1985 | Takeda |
| 5,034,117 | A | * | 7/1991 | De Bonneville et al. .... 208/140 |
| 6,239,055 | B1 | * | 5/2001 | Brunet et al. ............... 502/45 |
| 6,919,048 | B2 | * | 7/2005 | Hoffmann et al. .......... 422/146 |
| 2002/0159933 | A1 |   | 10/2002 | Hoffmann et al. |

FOREIGN PATENT DOCUMENTS

EP  1 236 506 A  9/2002
FR  2 129 913 A  11/1972

* cited by examiner

*Primary Examiner*—N. Bhat
(74) *Attorney, Agent, or Firm*—Millen, White, Zelano & Branigan, P.C.

(57) ABSTRACT

This invention relates to a staged-zone reactor of the axial-flow type that makes it possible to implement strongly endothermic or exothermic reactions. The reactor comprises a constriction of the catalytic bed between an upper zone (3a) and a lower zone (3b), making it possible to house in the reactor a heat exchanger for the intermediate heating or cooling of the effluents. Process of chemical conversion using this reactor for exothermic or endothermic reactions in the gas and/or liquid phase, and in particular for the oligomerization reaction of C2 to C12 fractions for the purpose of producing a diesel fraction.

6 Claims, 2 Drawing Sheets

MULTI-ZONE FIXED-BED OR MOVING-BED REACTOR WITH AN INTEGRATED HEAT EXCHANGER

FIELD OF THE INVENTION

This invention relates to a reactor inside of which is carried out at least one catalytic reaction that has a significant thermal effect, generally a release of heat (so-called exothermic reactions) or sometimes an absorption of heat (so-called endothermic reactions).

It also relates to a process for oligomerization of olefinic feedstocks (i.e., a polymerization or addition that is limited to essentially 2 to 6 monomers or molecules that are basic). It also relates in particular to the reactions for adding an olefin to another compound that is present in the feedstock, for example an olefin, a sulfur-containing compound, a nitrogen-containing compound, an aromatic molecule, whereby said addition reactions are aimed at increasing the molecular weight of this compound.

It relates more particularly to the oligomerization reactions starting from olefinic hydrocarbon fractions that contain 2 to 12 carbon atoms, preferably 3 to 7 carbon atoms, and more particularly 4 to 6 carbon atoms, whereby the oligomerization reactions make it possible to produce fractions of gasoline, diesel or lubricant, and more particularly hydrocarbons of the diesel fraction.

The invention relates to a reactor with several reaction zones, stacked vertically and separated by at least one heat exchange zone at a constriction of the catalyst path between the reaction zones.

BACKGROUND

It is known in the prior art to carry out chemical reactions, in particular for refining petroleum fractions or hydrocarbons, in catalytic reactors that use a granular bed. Generally, catalyst grains of a characteristic size between 0.5 and 5 mm are used. These catalyst grains often have an essentially spherical shape to facilitate their flow. They can, however, have another shape, for example if they are produced by extrusion. The catalysts that are used in the reactor according to the invention are all catalysts that have a characteristic size (for example, a diameter) of between 0.5 and 5 mm in diameter, and preferably between 1 to 4 mm.

In general, the deactivation of catalysts, and, for example, that of catalysts that comprise a zeolite used for the purpose of the production of diesel fractions by oligomerization, is fast. It is therefore necessary to initiate a replacement of the catalyst regularly so as to maintain the performance levels of the reactor in terms of selectivity and output.

Two types of technology are commonly used for this purpose:

In the "fixed-bed" technology, all of the catalyst that is contained in the reactor at the end of a cycle is changed when the consumption of the catalyst is considered to be spent. The operation is then typically cut off, the reactor is emptied, and then it is filled again by the new and/or regenerated catalyst.

Another type of technology is used for catalytic reactions with circulation (continuous or semi-continuous) and regeneration (continuous or semi-continuous) of the catalyst: that of the "moving bed" that consists of a stack of catalyst grains contained in the reactor, as in a fixed bed, but said grains moving (at a very slow average speed, continuously or intermittently) from the top to the bottom of the reactor under the effect of the force of gravity. At the bottom of the reactor, a small amount of spent catalyst is drawn off continuously or intermittently, and the same amount of new catalyst and/or regenerated catalyst is introduced at the top of the reactor. It is possible, for example, to draw off and to reintroduce a suitable amount of catalyst every 4 or 8 hours such that the overall activity of the catalyst remains constant. The spent catalyst that is drawn off is typically regenerated and then recycled, optionally except for a small amount of catalyst that is eliminated and replaced by new catalyst.

The reactor according to the invention can be used both in a fixed bed and in a moving bed, this second variant of implementation representing, however, the preferred variant.

Furthermore, for the reactions with strong endothermicity or with strong exothermicity, means for heat exchange with the reaction fluid (furnace or heat exchanger) are sometimes used inside or outside the reactor so as to maintain the temperature difference between the inlet and the outlet of the reactor within desired limits and/or to reset the temperature of the reaction fluid between two or more reactors that are arranged in a series.

Patent US 2002/0011428 A1 describes a multi-staged moving-bed reactor that is intended to implement hydrotreatment reactions. One system, subject of other patents (in particular patent U.S. Pat. No. 5,076,908), makes it possible to add and to withdraw catalyst continuously or semi-continuously from each stage of the reactor. The feedstock flows from one stage to the next. By contrast, the catalyst of one stage does not flow into the next stage. It was found that such a system can also be used to implement an oligomerization reaction. The described system, however, does not make it possible to effectively monitor the temperature profile within each reaction section.

Patent WO 02/04575 describes a process for oligomerization on a zeolite implementing a tubular-type reactor, in a fixed bed, or any other reactor that can be used so as to carry out the oligomerization reaction. The patent describes a method that makes it possible to add and to withdraw the catalyst continuously or semi-continuously from the reactor. By contrast, the problem of monitoring the exothermicity of the reaction is not addressed.

Patent EP 1236506A1 describes a multi-staged reactor with a small bed thickness with an internal heat exchanger, used primarily within the framework of reactions for dehydrogenating long paraffins. This system makes it possible to monitor specifically the temperature within each reaction section. In contrast, it is hardly suitable for implementing large amounts of catalyst, being suitable for small bed thicknesses. The catalyst filling rate in the reactor is very low here.

The above-mentioned patent applications that describe superposed or multi-staged reactors therefore do not describe means that make it possible both to use large amounts of catalyst and to implement integrated thermal means.

This invention describes a reactor and a process for chemical conversion of hydrocarbons that uses this reactor, making it possible to optimally resolve the problems that are linked to the implementation of strongly exothermic or endothermic reactions, in particular oligomerization reactions. It makes it possible to implement a compact reactor, having a large capacity for what the amount of catalyst present is and having, moreover, an inside volume that is noteworthy for the integration of a heat exchanger.

SUMMARY DESCRIPTION OF THE INVENTION

This invention will be illustrated in the particular case of an exothermic reaction for oligomerization of olefins within an olefinic feedstock (often comprising 20% to 100% by weight of olefins). Its field of application, however, is more extended and relates to all exothermic or endothermic reactions in gas phase and/or liquid phase for which typically a noteworthy catalytic volume and a thermal control are essential, in particular the reactions for addition of an olefin to another compound that is present in the feedstock, for example an olefin, a sulfur-containing compound, a nitrogen-containing compound, or an aromatic molecule, whereby said addition reactions aim at increasing the molecular weight of this compound.

In particular, this reactor is particularly suitable for the implementation of a reaction for oligomerization of olefinic hydrocarbon fractions that contain 2 to 12 carbon atoms, preferably 3 to 7 carbon atoms, and more preferably also 4 to 6 carbon atoms, making it possible to obtain hydrocarbons within the range of gasoline, diesel or lubricating oil fractions, and more particularly hydrocarbons of the diesel fraction of the typical distillation interval encompassed between 160 and 370° C., in particular between 200 and 365° C.

It is desirable, for this chemical reaction, to avoid important disparities of the catalytic activity between the different reaction zones that generate conversion losses.

In addition, the oligomerization reaction is strongly exothermic. Too high a temperature promotes the cracking reactions of oligomerized compounds and is therefore not desirable.

Too low a temperature in some reaction zones limits the conversion into adequately heavy compounds that are sought in the composition of a diesel fraction. It is therefore desirable to monitor the temperatures within various reaction zones specifically. In particular, it is advantageous to adjust the temperature level of a catalytic reaction zone based on the activity of the catalyst within said zone.

For these different reasons, it is desirable to implement several successive reaction zones, preferably with noteworthy or significant catalyst volumes, and to install heat exchange means making it possible to adjust the reaction fluid temperature between two successive zones.

To solve the above-mentioned technical problems, the invention proposes a reactor that has a noteworthy or significant catalytic volume, integrated heat exchange means, at a constriction in the path of a catalyst. In a preferred variant, the reactor according to the invention comprises means that make possible an implementation in a moving bed.

According to an optional characteristic arrangement, the reactor can comprise means that make it possible to implement, typically at the inlet of each reaction zone, an added portion of fresh or regenerated catalyst for its mixing with at least a portion of the (partially) spent catalyst that is obtained from the upstream reaction zone.

The invention also proposes a process for carrying out chemical reactions in this reactor, in particular a process for oligomerization of olefinic feedstocks.

DETAILED DESCRIPTION OF THE DRAWINGS

Figure 1:
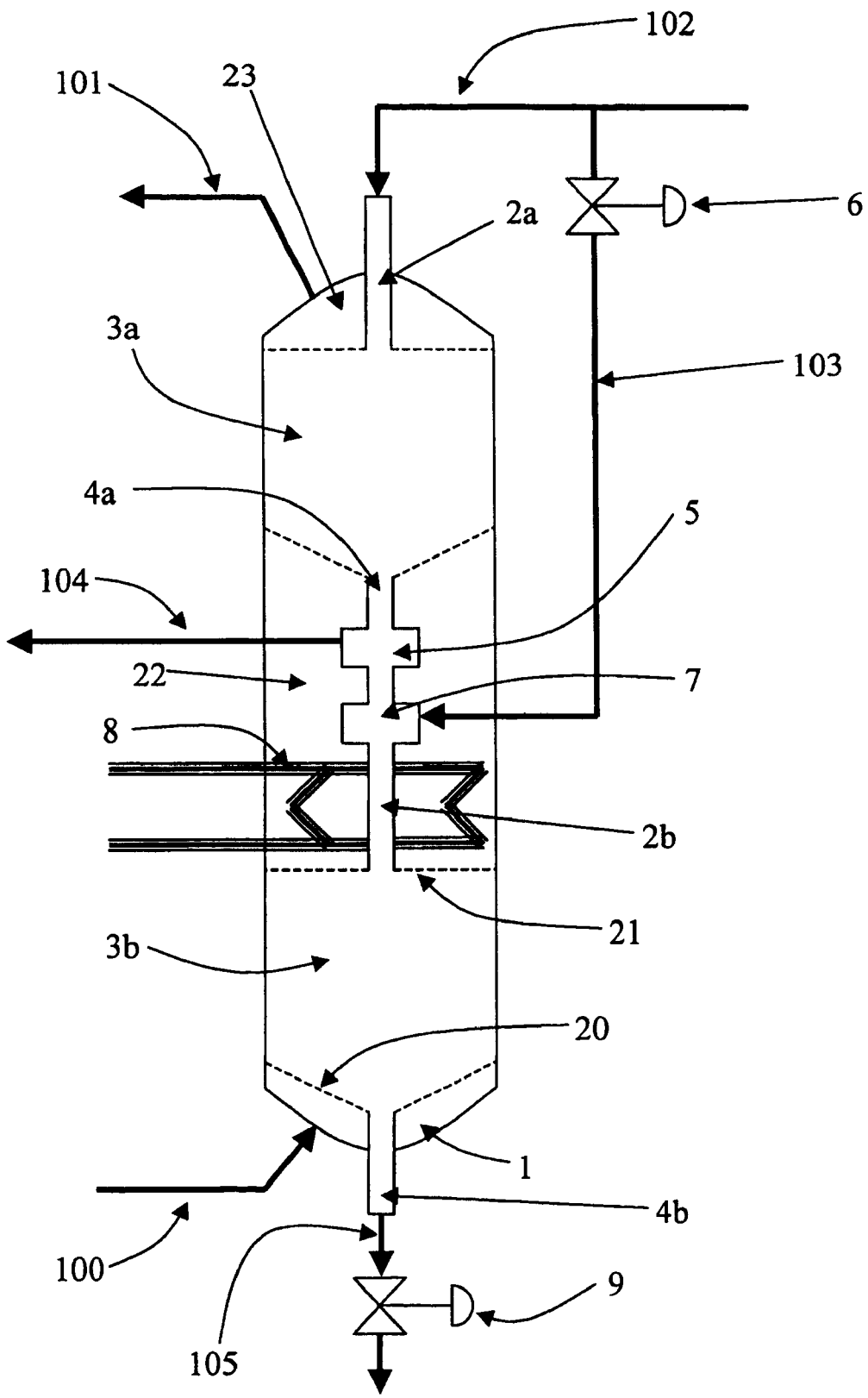
FIG. 1 shows a view of the reactor according to the invention in its basic configuration.
Figure 2:
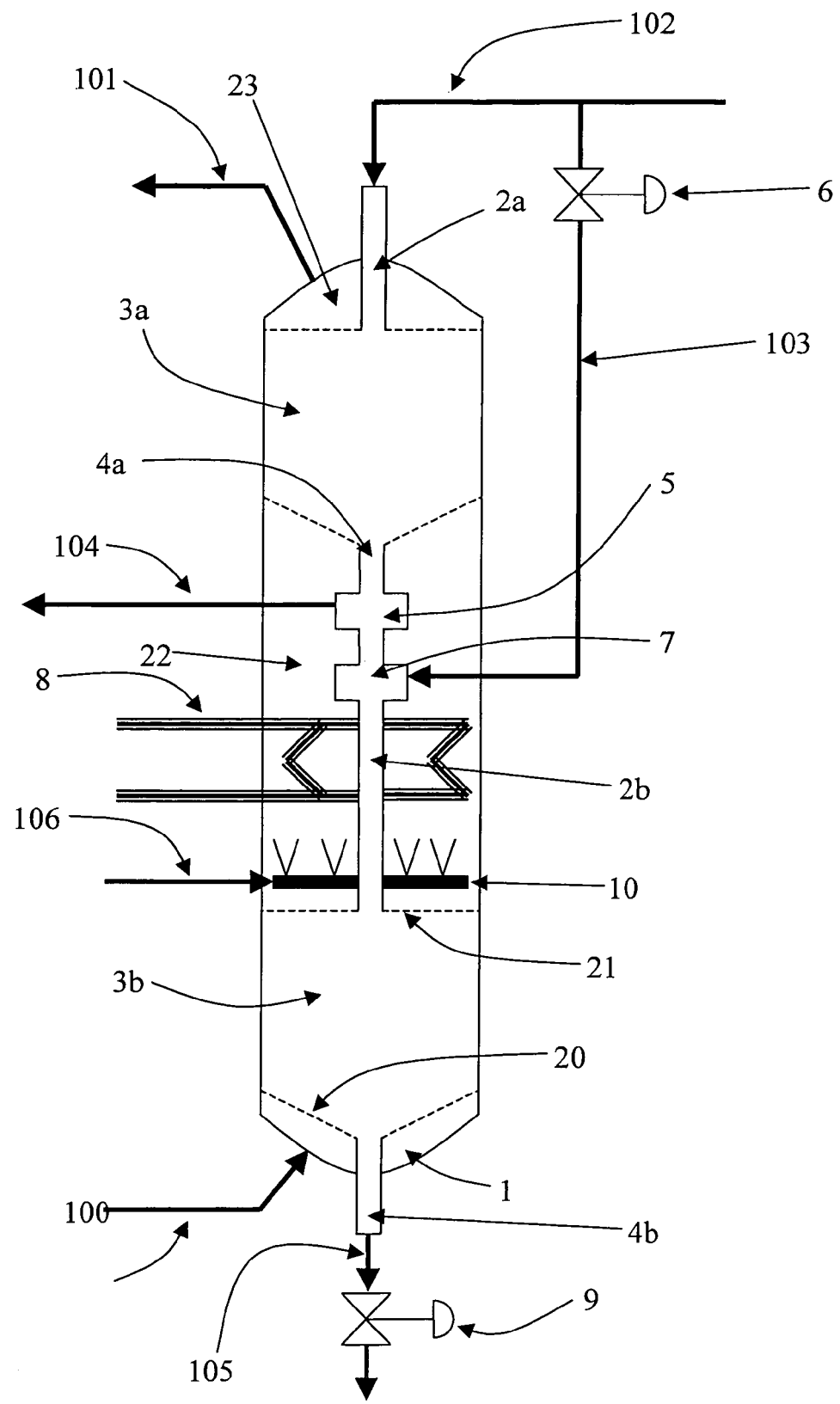
FIG. 2 shows a view of the reactor according to the invention in a variant that comprises an injection of an additional reaction fluid between two reaction zones.

The invention will be better understood in reference to FIGS. 1 and 2 that illustrate different embodiments of the invention without, however, limiting its scope.

The invention is illustrated in its basic configuration by FIG. 1.

In a general form, the invention relates to a reactor of elongated shape along an essentially vertical axis, whereby this reactor comprises several vertically-staged catalytic reaction zones in the same cylindrical shell, whereby this reactor is adapted to the axial circulation of the reaction fluid that is arranged in a series in each of these zones and comprises means (100) for introducing and means (101) for evacuating said reaction fluid, means (102) for intake of fresh or regenerated catalyst at the top of the reactor, and means (105) for evacuating spent catalyst in the lower portion of the reactor, whereby this reactor comprises in particular:

An upper reaction zone (3a) that is filled with granular catalyst, with a section (in a horizontal plane) that is essentially identical to that of the cylindrical shell on a portion of its height, directly connected via a constriction zone to a reaction zone (3b) that is also filled with granular catalyst and with a section that is essentially identical to that of the cylindrical shell on a portion of its height, located just below the upper reaction zone (3a), whereby these reaction zones (3a) and (3b) are two successive reaction zones that are directly connected, on the one hand, by a reaction effluent path, and, on the other hand, by a catalyst path from zone (3a) to zone (3b) through said constriction zone, whereby zone (3a) is connected at its upper portion, directly or indirectly, to said means (102) for feeding fresh or regenerated catalyst, whereby zone (3b) is connected at its lower portion, directly or indirectly, to said means (105) for evacuating spent catalyst, whereby the reactor, located at the constriction zone between this constriction zone and the cylindrical shell of the reactor, also comprises a heat exchanger (8) for heating or cooling the reaction fluid that circulates between zones (3a) and (3b).

Zones (3a) and (3b) being filled with granular catalyst over a section that is essentially identical to that of the cylindrical shell of the reactor over a portion of its height, they therefore have a high catalytic volume. The constriction zone that allows the catalyst path to house an integrated exchanger in the reactor at this typically annular zone is advantageous, however.

In its lower portion, zone (3a) preferably comprises an essentially conical convergent that comprises perforations for the path of reaction fluid, connected to a channel (2b) with a small diameter relative to that of the reactor, whereby this channel delimits at least a portion of the constriction zone into which the catalyst can flow (at the end of each cycle in a fixed bed; continuously or semi-continuously in a moving bed). This channel (2b) typically has a diameter of between 1% and 50% of the diameter of the reactor at the constriction zone, preferably between 1% and 30%, and very preferably between 2% and 20%. A large available space between the constriction zone and the cylindrical shell that is advantageously used to install heat exchanger (8) results therefrom. Relative to the prior art, two advantages are brought together: the one linked to the use of large volumes of catalyst (the reaction zones that have the diameter of the reactor, in connection with axial-reactor-type reaction zones, into which the reaction fluid flows primarily in an essentially parallel way to the vertical axis of the reactor), and the one of still being able to house an integrated heat exchanger, thanks to the constriction. Typically, heat exchanger (8) is located around the constricted catalyst path.

The invention can relate both to a fixed-bed reactor and to a moving-bed reactor, even if use in a moving bed is preferred. In the case of a fixed-bed reactor, all of the reaction zones are completely filled by regenerated and/or fresh catalyst, and the reactor is completely emptied of all its catalyst when the latter, at the end of an operating cycle (in a fixed bed), is spent to such a point that its replacement is necessary.

According to the invention, two zones (3a) and (3b) are successive reaction zones, which means that the effluents of one of these zones feed the other zone without passing through another reaction zone.

According to a variant of the invention, usable in a moving bed, the reactor that is shown in FIG. 1 comprises means for draw-off and evacuation (104) of a portion of the spent catalyst that is obtained from upper reaction zone (3a) connected to collecting means. This makes it possible to eliminate a portion (for example 10 to 70%, and often 15 to 50% of the spent catalyst before the introduction of regenerated and/or fresh catalyst.

Thus, the average activity of the catalyst in a mixture that supplies (3b) is increased, generally without significantly increasing the total flow of catalyst entering into (3b), and even by keeping the flow of catalyst that circulates in (3a) and in (3b) constant. With a constant total flow of fresh and/or regenerated catalyst, the invention makes it possible to obtain a certain rebalancing of the catalytic activity between the different reaction zones.

This added portion of regenerated and/or fresh catalyst can also represent, for example, from 10 to 70%, and often 15 to 50% of the catalyst that supplies (3a) to the top of the reactor or else that supplies (3b).

Typically, two successive reaction zones (3a) and (3b) are connected by a circuit for circulating reaction fluid that passes through heat exchanger (8) for heating or cooling this reaction fluid, whereby this circuit typically is established essentially around the constriction zone, between this zone and the cylindrical shell of the reactor, in an intermediate zone that is located between two successive reaction zones (3a) and (3b). Optionally, according to a variant that is shown in FIG. 2, the intermediate zone comprises means (10) for introducing one or more additional reaction fluids (106) and for mixing this or these fluids with the reaction fluid that circulates between successive reaction zones (3a) and (3b). It may be useful in particular to add a new chemical reagent to carry out a reaction subsequent to the one carried out in the upstream zone, for example a reaction for alkylation of an aromatic molecule or a mixture of aromatic compounds and/or for introducing a hydrogen-rich recycling gas (comprising more than 50 mol % and often more than 70 mol % of H2) so as to increase the amount of hydrogen present. This gas can also have a thermal effect, a heating effect or more frequently a cooling effect of effluents before they return into the downstream reaction zone.

The reactor of the invention, and all its variants as described in this application, can be used in particular within the scope of a process for chemical conversion of hydrocarbons, and in particular a process for oligomerization of olefinic feedstocks that have 2 to 12 carbon atoms, whereby this or these process(es) constitute another object of the invention.

In such a process, in particular of oligomerization, the typical conditions are as follows: the pressure is between 0.1 and 10 MPa and preferably between 0.3 and 7 MPa, the temperature is between 40 and 600° C. and preferably between 60 and 400° C., the hourly volumetric flow rate VVH is between 0.01 and 100 $h^{-1}$ and preferably between 0.4 and 30 $h^{-1}$ and the catalyst circulates in each reaction zone at a speed (average) of between 1 cm/hour and 200 cm/hour and preferably between 2 cm/hour and 100 cm/hour.

The invention is particularly suited to processes in which the operating conditions are selected: temperature, pressure VVH, so as to limit the temperature variation within each of the reaction zones to one or more values of between 2° C. and 50° C. Heat exchanger (8) typically can cool the reaction fluid (or heat it for an endothermic process) from 2 to 50° C., and preferably from 10 to 50° C.

DETAILED DESCRIPTION OF THE FIGURES

Reference is now made again to FIG. 1. In the reactor that is shown, the catalyst passes through all of the reaction zones in a downward flow, and the feedstock (the reaction fluid) also passes through all the reaction zones but counter-current to the catalyst. The reaction zones that are shown are of the axial-reactor type. However, a configuration in which the reaction fluid would circulate at co-current of the catalyst, i.e., from top to bottom, is also perfectly possible within the scope of the invention. Furthermore, the reaction zones can be of the radial-reactor type. An axial-reactor configuration is preferred, however.

The fresh and/or regenerated catalyst is supplied, primarily in general, to the top of the reactor via line (102), then tube (2a). This catalyst flows slowly, continuously or intermittently, into a zone (3a), referenced (3a) in FIG. 1, which is the upper reaction zone. At the lower portion of this zone, it is collected in a collecting zone (4a), then it flows into chamber (5). A fraction of this catalyst, partially spent, is drawn off via tube (104), typically to be regenerated. Chamber (5) can be provided with means (not shown) for facilitating the extraction of a granular product such as the catalyst, for example an extracting screw, or a pneumatic transport drum, or a fluidized bed or any other means that is known to one skilled in the art. It is also possible to use a tube (104) that is inclined by at least 60° relative to the horizontal line and optionally injections of aeration gas of the catalyst (for example nitrogen) to facilitate the evacuation of the catalyst.

The non-extracted portion of the catalyst that is present in chamber (5) flows into mixing chamber (7) to be mixed with another portion of the fresh and/or regenerated catalyst, introduced by line (103), via valve (6). It is possible to use a tube (103) that is inclined by at least 60° relative to the horizontal, including in its end portion, and optionally injections of aeration gas of the catalyst (for example nitrogen) to facilitate the introduction of the fresh and/or regenerated catalyst.

Mixing chamber (7) can be provided with means (not shown) to facilitate the mixing of fresh/regenerated catalyst and partially spent catalyst. It is possible in particular to use a rotating basket for stirring the catalyst in zone (7) or else stirring blades that are located in zone (7) and moved via an external motor. It is also possible to use a fluidized bed or any other known granule mixing system.

The thus formed mixture of catalysts has a catalytic activity that has been increased relative to that of the spent catalyst that is obtained from zone (3a). This mixture passes through a constriction path (2b) then supplies zone (3b), referenced (3b) in FIG. 1, which is immediately less than (3a) (from the viewpoint of reaction zones).

The spent catalyst that is obtained from zone (3b) circulates in an extracting tube (4b) then is evacuated from the reactor via tube (105) on which valve (9) is found. It is then sent to a regeneration zone (not shown) via a system for particle transport by means of a liquid or gaseous transport fluid (for example nitrogen), according to well-known technologies of one skilled in the art relative to the moving bed. It is possible in particular to use, at the level of tube (105) or below valve (9), a receiving flask for the spent catalyst that makes it possible to store a determined amount of catalyst before its sequential evacuation via pneumatic transport, generally by means of a primary fluid for aeration of the catalyst and a secondary transport fluid.

The technologies that make it possible to introduce, to extract, to mix or to transport granular products are generic technologies that are well known to one skilled in the art, to which the invention is not linked.

The regeneration zone of the catalyst, not shown, can be equipped with a gas classifier or any other means that makes it possible to separate the fine particles that are created during various operations for transport of catalyst. The regenerated catalyst (in particular after a controlled oxidation of carbon deposits) is typically recycled via tubes (102) and (103) with an added portion of fresh catalyst. A fraction of the catalyst of the loop (often spent catalyst) is generally evacuated to make possible the addition of fresh catalyst by keeping constant the total amount of catalyst used.

The reaction fluid, for example a C4-C6 olefinic hydrocarbon feedstock (essentially having 4 to 6 carbon atoms), is fed via tube (100) into feed chamber 1, passes through initial reaction zone (3b) filled with catalyst, then intermediate zone (22) that does not contain catalyst, then returns to final reaction zone (3a) filled with catalyst, then returns into chamber (23) before being evacuated via tube (101). Reaction zones (3a) and (3b) are advantageously provided at the upper and lower portion with perforated grids (shown in dotted lines in the figures) to make possible the path of reaction fluid. These grids can be inclined by an angle of 60° or more, in the lower portion, to facilitate the flow of the catalyst. A heat exchanger (8) with thermal fluid circulation is located inside the reactor in intermediate zone (22) (itself located inside the reactor) to carry out a heat exchange with the reaction fluid that moves between (3b) and (3a). This heat exchanger is advantageously located at constriction 2b of the catalyst path because of the space thus cleared inside the reactor.

This heat exchanger generally makes use of a thermal heating or cooling fluid that circulates inside tubes, all of the tubes forming, for example, one or more pins extending into the reaction fluid in intermediate zone (22). The exchanger, however, can be of any type that is known to one skilled in the art, for example a plate exchanger, or fin tube exchanger, or bare-tube or straight-tube exchanger, or an exchanger with a spiral wound around the vertical axis of the reactor (and typically of the constriction zone), whereby the invention is in no way limited to a particular technology of this exchanger.

Various pressurized fluids can be used as a thermal fluid for heating or cooling: water vapor, air, water, hydrogen or hydrogen-rich recycling gas, nitrogen, molten salts, aromatic oil, the feedstock itself, etc.

FIG. (2) shows another reactor according to this invention, comprising the same elements as those of the reactor of FIG. 1. In addition, it comprises a tube (106) for the addition of an additional reaction fluid, for an added portion of reagent and/or an added portion of hydrogen. This fluid is distributed into intermediate zone (22) via a distribution line (10) to facilitate its homogeneous mixing with the reaction fluid that is obtained from zone (3b). The mixing is also promoted by the fact that intermediate zone (22) is free of catalyst.

The advantages of the reactor(s) according to this invention relative to the known reactors of the prior art are:
- a clear improvement in performance levels (conversion, selectivity, yield)
- a more significant reliability of the installation due to the simplicity and the compactness of the means used, in particular heat exchange means that are implemented
- the cost of the reactor and that of its installation are also reduced because of its compactness.

A typical operation of the reactor of FIG. 1 is as follows: the flow rate of the added portion of regenerated catalyst or optionally fresh catalyst is defined so as to keep a determined level of activity on each reaction zone. For example, this catalyst addition flow rate can be defined based on a characteristic of the reaction fluid at the reaction zone outlet. This characteristic can be a temperature, a composition, a conversion, or any other physico-chemical characteristic that can be measured on line. The correlations that link one or more of these values that can be measured on line and the activity level of the catalyst depend on the reaction that is implemented, the type of catalyst and its speed of circulation. A simple means is in particular to control the conversion in zone (3b) or the temperature variation (delta T) of the reaction fluid in this zone, or else the outlet temperature of this zone, by action on the supply flow rate of the regenerated and/or fresh catalyst: If the measured value of delta T is less than the value that is provided (typically depending on the initial composition of the feedstock), or if the value of the outlet temperature of the zone corresponds to an inadequate reaction, the supply flow rate of regenerated and/or new catalyst is increased in this zone, and conversely, the added portion is reduced if the conversion in the zone (deduced from delta T or the outlet temperature) is too significant. It is possible to simultaneously evacuate the same amount of spent catalyst as that of the added portion of catalyst before carrying out the mixing to keep constant the overall flow rate of catalyst in zone (3b).

The flow rate of the added portion of catalyst can therefore be entirely automated. Alternatively, it is possible to be adjusted at certain times (for example once or twice per day) by the operator, based on temperatures and/or the above-mentioned delta T in particular.

The heating or cooling of reaction fluid in exchanger (8) (delta T) can be controlled in particular by the flow rate or the temperature level of the thermal fluid that circulates in exchanger (8).

The reactor of FIG. 2 operates analogously. In this reactor, an added portion of reagents and/or hydrogen that is fed by tube (106) is used. This added portion typically has a controlled flow rate and temperature.

The catalyst that circulates in the reactor according to the invention can be of various types. In the case of an oligomerization reactor, it is possible to use in particular any type of acid catalyst that allows the oligomerization, for example an amorphous silica-alumina-type catalyst or a solid phosphoric acid-type catalyst or an ion exchange resin-type catalyst, or then a catalyst that exhibits a selectivity of shape, for example a zeolitic catalyst, for example a zeolitic catalyst of the structural type MFI, FER, EUO, TON, LTL, MOR, MTT, MEL, MWW, MTW or the zeolites NU-86, NU-87, NU-88 and IM-5.

These zeolitic acid catalysts can be used as is or after modifications, whereby said modifications preferably affect the acidity of the catalyst, and whereby the term acidity designates both the inherent force of the acid sites and the concentration of acid sites.

These modifications can affect the framework of the zeolite, for example, if it is a dealuminification by steam treatment or by acid treatment, and/or affect the surface of the zeolite, for example (i) by exchanges of protons by cations of alkaline types, (ii) by inert phase deposits on the surface of zeolites.

The preferred operating conditions are those that are used in a standard manner for the oligomerization of olefins by catalysts of acid solid type:
- a temperature of between 100° C. and 300° C.
- a pressure of between 0.1 and 7 MPa a VVH (volumetric flow rate expressed as the ratio of the volumetric flow rate of feedstock to the catalyst volume contained in the reaction zone) of between 0.01 and 100 h⁻.

The reactor according to the invention is particularly suited to olefin oligomerization reactions, but it can be used more generally for any type of exothermic or endothermic reaction, taking place in gas and/or liquid phase, and for which a fine control of the temperature profile in each reaction zone is necessary, in particular the reactions for addition of an olefin to another compound that is present in the feedstock, for example an olefin, a sulfur-containing compound, a nitrogen-containing compound, an aromatic molecule, said addition reactions being aimed at increasing the molecular weight of this compound, in particular the reactions for alkylation of thiophenic compounds by olefins, the metathesis of olefins. The reactor according to the invention can also be used for the skeletal isomerization reactions of light olefins, such as, for example, the olefins with 4 or 5 carbon atoms.

In the case of exothermic reactions, the thermal fluid of cooling (coolant) can be any fluid that is suitable for carrying out the heat exchange under good conditions, in particular by observing a mean temperature difference between the reaction fluid and the cooling fluid of at least 5° C. and preferably at least 10° C.

The invention is in no way tied to a particular cooling or heating fluid.

EXAMPLE ACCORDING TO THE INVENTION

This example relates to the reaction of oligomerization of an unsaturated C3 fraction on a bed in a reactor according to the invention, such as the one of FIG. 1.

The reactor comprises two reaction zones denoted as (3b) (initial zone (3b)) and (3a) (final zone (3a)), in a series, separated by an intermediate zone that comprises a water cooling system that constitutes heat exchanger (8).

The feedstock and the catalyst circulate at counter-current.

A dealuminified mordenite zeolite-type catalyst that has an Si/Al molar ratio of 57 was tested for the propane oligomerization reaction, after being shaped as balls with an alumina binder. The catalyst that is used is shaped in spherical balls that are 3 mm in diameter.

The feedstock that is used for this test is a feedstock that is obtained from steam cracking that contains 94% by weight of propane and 6% by weight of propane.

The conditions were selected so as to optimize the formation of the diesel fraction in the oligomerate produced.

The operating conditions are as follows:

| | |
|---|---|
| Temperature of the feedstock at the inlet of the reactor | 210° C. |
| Pressure | 5.5 MPa |
| VVH | 0.7 h⁻¹ |

The volumetric flow rate of feedstock per volume of catalyst (VVH) was calculated based on the total catalyst mass in the two reaction zones. The addition of fresh and regenerated catalyst is done so as to keep a stable conversion in the two reaction zones.

20% of the spent catalyst that is obtained from the upper reaction zone that is replaced by regenerated catalyst in an identical amount is drawn off to increase the catalytic activity in the lower reaction zone.

The temperature of the cooling liquid is regulated so that the reaction temperature at the inlet of the second reaction zone is equal to 210° C. The cooling fluid that is used is water that is introduced at 25° C.

The results that are obtained are reported in Table 1.

TABLE 1

| Zeolite | MOR |
|---|---|
| Si/Al Molar Ratio | 57 |
| Reaction zone inlet temperature (3b) (° C.) | 210 |
| Reaction zone outlet temperature (3b) (° C.) | 227 |
| Reaction zone inlet temperature (3a) (° C.) | 210 |
| Reaction zone outlet temperature (3a) (° C.) | 225 |
| C5+ oligomer (% by weight) | 86.5 |
| Diesel fraction (>180° C., % by weight) | 81.2 |
| Engine cetane number* | 38 |

*After hydrogenation

The use of the reactor according to this invention, in particular for the oligomerization reaction of olefinic feedstock ranging from C3 to C6, provides several major improvements:

The reactor is compact while having a high catalytic volume and an integrated heat exchanger. Its cost as well as its installation cost are relatively low.

The addition of new or regenerated catalyst in zone (3b) makes possible, as a variant, an at least partial rebalancing of the catalytic activity between the reaction zones, which is favorable to the yield of the diesel fraction.

The continuous regeneration system of a portion of the catalyst makes it possible, as a variant, to operate without having to stop the unit to change the catalyst.

The heat exchange zone that is located between the two reaction zones makes possible an improvement of the homogeneity of the temperature in the two reaction zones.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosure of all applications, patents and publications, cited herein and of corresponding French application No. 04/11959, filed Nov. 9, 2004 is incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A reactor system comprising a source of fresh or regenerated catalyst reactor of elongated shape along an essentially vertical axis, said reactor comprising a cylindrical shell and several vertically-staged catalytic reaction zones in said cylindrical shell, whereby said reactor is adapted to the axial circulation of a reaction fluid serially in each of said zones and comprises means (100) for introducing and means (101) for evacuating said reaction fluid, means (102) connected to said source of fresh or regenerated catalyst for intake of fresh or regenerated catalyst at the top of the reactor, and means (105) for evacuating spent catalyst in the lower portion of the reactor, said reactor comprising:

an upper reaction zone (3*a*) filled with granular catalyst, at least a section of zone (3*a*) being vertical and diametrically coextensive to that of the cylindrical shell on a portion of its height, directly connected via a constriction zone to a reaction zone (3*b*) that is also filled with granular catalyst at least a section of zone (3*b*) being vertical and diametrically coextensive to that of the cylindrical shell on a portion of its height, located just below the upper reaction zone (3*a*), whereby said reaction zones (3*a*) and (3*b*) are two successive reaction zones that are directly connected by a reaction effluent path, and by a catalyst path from zone (3*a*) to zone (3*b*) through said constriction zone, whereby zone (3*a*) is connected at its upper portion, directly or indirectly, to said fluid means (102) for feeding fresh or regenerated catalyst, whereby zone (3*b*) is connected at its lower portion, directly or indirectly, to said means (105) for evacuating spent catalyst, whereby the reactor, placed at the constriction zone between this constriction zone and the cylindrical shell of the reactor, also comprises a heat exchanger (8) for heating or cooling reaction fluid circulating between zones (3*a*) and (3*b*), and means for transporting fresh and/or regenerated catalyst to said reactor.

2. A reactor system according to claim 1, in which zone (3*a*) in its upper portion comprises an essentially conical convergent that comprises perforations for the path of reaction fluid, connected to a channel (2*b*) with a reduced diameter relative to that of the reactor, whereby said channel delimits at least a portion of the constriction zone.

3. A reactor system according to claim 2, in which said channel (2*b*) has a diameter of between 1% and 50% of the diameter of the reactor at the constriction zone.

4. A reactor system according to claim 1, further comprising conduit means in communication with said source of fresh or regenerated catalysts and for passing said fresh or regenerated catalysts directly into said constriction zone.

5. A reactor system according to claim 4, further comprising conduit means for introducing additional reaction fluid into a zone outside the constriction zone and between the reaction zones 3(*a*) and 3(*b*).

6. A reactor system according to claim 1, further comprising conduit means for introducing additional reaction fluid into a zone outside the constriction zone and between the reaction zones 3*a* and 3*b*.

* * * * *

UNITED STATES PATENT AND TRADEMARK OFFICE
CERTIFICATE OF CORRECTION

PATENT NO. : 7,611,677 B2
APPLICATION NO. : 11/267570
DATED : November 3, 2009
INVENTOR(S) : Louret et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 876 days.

Signed and Sealed this

Twelfth Day of October, 2010

David J. Kappos
*Director of the United States Patent and Trademark Office*